US012760695B2

(12) United States Patent
Burke et al.

(10) Patent No.: US 12,760,695 B2
(45) Date of Patent: Oct. 13, 2026

(54) ROTATING DETONATION ENGINE INJECTOR AND METHOD OF DESIGNING

(71) Applicant: University of Central Florida Research Foundation, Inc., Orlando, FL (US)

(72) Inventors: Robert Burke, Orlando, FL (US); Taha Rezzag, Orlando, FL (US); Adam Kotler, Orlando, FL (US); Kareem Ahmed, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 18/111,778

(22) Filed: Feb. 20, 2023

(65) Prior Publication Data

US 2023/0340931 A1 Oct. 26, 2023

Related U.S. Application Data

(60) Provisional application No. 63/332,894, filed on Apr. 20, 2022.

(51) Int. Cl.
*F02K 9/52* (2006.01)
*F02C 5/10* (2006.01)
*F02K 9/62* (2006.01)
*F23R 7/00* (2006.01)

(52) U.S. Cl.
CPC .................. *F02K 9/52* (2013.01); *F02C 5/10* (2013.01); *F02K 9/62* (2013.01); *F23R 7/00* (2013.01)

(58) Field of Classification Search
CPC ........................................................ F02K 9/52
See application file for complete search history.

(56) References Cited

U.S. PATENT DOCUMENTS

| | | | | |
|---|---|---|---|---|
| 3,334,490 A * | 8/1967 | Hoeptner | F02K 9/52 60/258 |
| 5,279,484 A * | 1/1994 | Zimmermann | B64G 1/12 244/171.1 |
| 7,914,279 B2 * | 3/2011 | Ghani | F23L 7/007 431/351 |

FOREIGN PATENT DOCUMENTS

WO 2021/026543 A1 2/2021

OTHER PUBLICATIONS

Nicholls, J. A. and Cullen, R. E., "The Feasibility of a Rotating Detonation Wave Rocket Motor," Final Report RPL-TDR-64-113, University of Michigan, Apr. 1964, pp. 1-310. (Year: 1964).*

(Continued)

*Primary Examiner* — Lorne E Meade
(74) *Attorney, Agent, or Firm* — Anton J. Hopen; Trenam Law

(57) ABSTRACT

A rotating detonation engine (RDE) injector and method of creating the same. In some embodiments, the RDE injector is configured such that the fuel to oxidizer pressure ratio is in a range of 0.8775 to 1.4917. In some embodiments of the method of creating a RDE a particular combination of propellants is identified, and their gas specific constant and specific heat ratio are recorded. A plurality of initial flow conditions is established, and the compressible mass flow equation is used to determine an appropriate cross-sectional area of each injector to produce a fuel to oxidizer pressure ratio is in a range of 0.8775 to 1.4917.

2 Claims, 7 Drawing Sheets

(56) References Cited

OTHER PUBLICATIONS

Lu et al., "Rotating Detonation Wave Propulsion: Experimental Challenges, Modeling, and Engine Concepts", AIAA-2011-6043, 47th AIAA/ASME/SAE/ASEE Joint Propulsion Conference & Exhibit, San Diego, California, Jul. 31-Aug. 3, 2011, pp. 1-20. (Year: 2011).*

Wang, Yuhui and Wang, Jianping "Effect of equivalence ratio on the velocity of rotating detonation", International Journal of Hydrogen Energy, vol. 40, Issue 25, 2015, pp. 7949-7955. (Year: 2015).*

"Mass Flow Rate Equations" website, NASA Glenn Research Center, [https://www1.grc.nasa.gov/beginners-guide-to-aeronautics/mass-flow-rate-equations/ accessed on Jan. 30, 2024] (Year: 2024).*

Barrere et al., "Rocket Propulsion", Elsevier Publishing Company, New York, 1960, pp. 369-371. (Year: 1960).*

Screen captures from YouTube video clip entitled "UT Arlington Rotating Detonation Wave Engine Initial Testing Compilation", 6 pages, uploaded on Oct. 28, 2009 by user "emb8". Retrieved from Internet: <https://www.youtube.com/watch?v=QbJgOk2rDbl>. (Year: 2009).*

Screen captures from YouTube video clip entitled "Pioneering the rotating detonation engines in the 1950s", 4 pages, uploaded on Mar. 30, 2017 by user "Michigan Engineering". Retrieved from Internet: <https://www.youtube.com/watch?v=DaHioh0emTo>. (Year: 2017).*

Screen captures from YouTube video clip entitled "Rotating Detonation Engine (RDE)—Dynamics and Bifurcations", 3 pages, uploaded on Apr. 10, 2020 by user "Nathan Kutz". Retrieved from Internet: <https://www.youtube.com/watch?v=Ws4kbgfpKCw>. (Year: 2020).*

Koch et al., "Mode-locked rotating detonation waves: Experiments and a model equation", Physical Review E, vol. 101, Jan. 10, 2020, pp. 013106-1 to 013106-11. (Year: 2020).*

Sosa et al., Experimental evidence of H 2 /O 2 propellants powered rotating detonation waves, Combustion and Flame, 2020, pp. 136-138.

* cited by examiner

ROTATING DETONATION ENGINE INJECTOR AND METHOD OF DESIGNING

CROSS-REFERENCE TO RELATED APPLICATIONS

This nonprovisional application claims priority to provisional application No. 63/332,894, entitled "ROTATING DETONATION ENGINE INJECTOR AND METHOD OF DESIGNING," filed Apr. 20, 2022 by the same inventor(s).

FEDERALLY SPONSORED RESEARCH OR DEVELOPMENT

This invention was made with Government support under FA9550-16-1-0403 awarded by the Air Force Office of Scientific Research and under FA9300-19-P-1003 awarded by the US Air Force. The government has certain rights in the invention.

BACKGROUND OF THE INVENTION

1. Field of the Invention

This invention relates, generally, to propellant injectors. More specifically, it relates to a propellant injector for a rotating detonation engine and a method for designing an injector to work with specific propellants.

2. Brief Description of the Prior Art

The advancement of propulsion and power generation is limited by the efficiency of combustion cycles—how the fuel is burned to produce energy. Conventional engines that are found in everything from automobiles to passenger planes have been steadily improving for the past century; however, recent performance gains have reached an impassable limit, with increases in efficiency less than 1% over the last decade. The research community now looks to another engine-type which operates on a form of combustion that was discovered in the late 19th century: detonations.

The detonation is a wave-like phenomenon that moves faster than the speed of sound while burning fuel. The process is incredibly violent and difficult to control but releases magnitudes of energy more than in our conventional engines today. Detonations are quite common, occurring at the small scale in TNT explosions and at the large scale in star supernovae. The detonation phenomenon was discovered in the late 19th century and studied to understand how detonations initiate. Then in 1950, an engine was developed that could harness the power of a continuously propagating detonation. This engine was known as the Rotating Detonation Engine, or "RDE." The RDE was on pace to quickly become the standard engine, but not many scientists and engineers knew about it. Thus, the RDE was forgotten—that is until its resurgence as a global research push in 2000. The RDE has only been growing in popularity and development, with the United States, Poland, Russia, and Japan finding the greatest traction.

The RDE is particularly useful in rockets as a rotating detonation rocker engine or "RDRE." A critical aspect of the RDRE functionality is the fuel-oxidizer propellant mixture. Comprehensive computational and experimental work has successfully demonstrated RDRE operation. Early RDRE studies have been largely focused on gaseous methane oxygen and hydrocarbons motivated by booster stage rocket systems. However, none of the literature provided successful RDRE detonation using $H_2/O_2$, which is a propellant mixture relevant for upper stage rocket systems.

Although the onset of detonation is expected to occur in a homogeneous quiescent mixture of $H_2/O_2$, it is exceptionally challenging to sustain $H_2/O_2$ detonations in a RDRE. Recently, it was reported that rotating detonations are not possible due to the pre-ignition of the extremely reactive $H_2/O_2$ mixture occurring prior to the arrival of a detonation. The high reaction temperatures ~3700 K and the short injection-phase ignition delay relative to the wave cycle time induces upstream and downstream deflagrations and detonation quenching. This pre-ignition forms product recirculation zones that disrupt the detonation and result in deflagrations rather than detonations. Additionally, inadequate injection mixing of $H_2/O_2$ due to hydrogen's high diffusivity, low density, and high injection velocity impacts the local mixture composition.

Accordingly, what is needed is an improved injector configured to detonate hydrogen and oxygen in a RDE and a method for designing RDE injectors to work with desired propellants. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved injector configured to detonate hydrogen and oxygen in a RDE and a method for designing RDE injectors to work with desired propellants is now met by a new, useful, and nonobvious invention.

An embodiment of the present invention includes a method of designing a propellant injector for an existing RDE. The method requires identifying a preferred fuel propellant and a preferred oxidizer propellant. In some embodiments, the fuel propellant is hydrogen and the oxidizer propellant is oxygen.

The method further includes acquiring initial flow conditions for the preferred fuel propellant through a fuel injector nozzle and the preferred oxidizer propellant through an oxidizer injector nozzle. The initial flow conditions of each preferred propellant include an initial mass flow rate and an initial upstream pressure. The mass flow rate of each preferred propellant may be acquired by identifying a fuel-air equivalence ratio of the RDE and a total mass flow rate of the RDE and calculating the mass flow rate for each preferred propellant based on the fuel-air equivalence ratio of the RDE and the total mass flow rate of the RDE. The mass flow rate of each preferred propellant can also correspond to mass flow rates of previously used propellants for the RDE.

The initial upstream pressure is upstream relative to an outlet aperture of a corresponding injector nozzle. The initial upstream pressure of each preferred propellant is determined from upstream pressures of previously used propellants for the RDE. In addition, the mass flow rate and initial upstream pressure of the preferred fuel propellant or previously used fuel propellant are determined at a distance from the fuel injector outlet aperture that is generally an equivalent distance from the oxidizer injector outlet aperture at which the mass flow rate and initial upstream pressure of the preferred or previously used oxidizer propellant are determined.

A temperature for each preferred propellant is also identified. The temperature for each preferred propellant is based on at least a propellant storage system or propellant feed system of the RDE.

The method further includes calculating an initial cross-sectional area of the fuel injector nozzle using Equation 1:

$$\dot{m} = \frac{AP}{\sqrt{T}}\sqrt{\frac{\gamma}{R}}\left(1 + \frac{\gamma - 1}{2}\right)^{\frac{\gamma+1}{2(\gamma-1)}} \tag{1}$$

where $\dot{m}$ is the initial mass flow rate of the preferred fuel propellant, A is the initial cross-sectional area of the fuel injector nozzle, P is the initial upstream pressure of the fuel propellant, T is the temperature of the fuel propellant, R is the gas specific constant of the preferred fuel propellant, and $\gamma$ is the specific heat ratio of the preferred fuel propellant.

An initial cross-sectional area of the oxidizer injector nozzle is also calculated using Equation 1, where $\dot{m}$ is the mass flow rate of the preferred oxidizer propellant, A is the initial cross-sectional area of the oxidizer injector nozzle, P is the initial upstream pressure of the preferred oxidizer propellant, T is the temperature of the preferred oxidizer propellant, R is the gas specific constant of the preferred oxidizer propellant, and $\gamma$ is the specific heat ratio of the preferred oxidizer propellant.

Then, an updated upstream pressure of the preferred fuel propellant is calculated using Equation 1 with the calculated initial cross-sectional area for the preferred fuel propellant and an updated upstream pressure of the preferred oxidizer propellant is calculated using Equation 1 with the calculated initial cross-sectional area for the preferred oxidizer propellant. If a fuel-oxidizer pressure ratio for the updated upstream pressures is outside of a range of 0.8775 to 1.4917, the initial cross-sectional area for one or both of the fuel injector nozzle and the oxidizer injector nozzle is adjusted and the updated upstream pressure is recalculated until the fuel-oxidizer pressure ratio is in a range of 0.8775 to 1.4917. Once the fuel-oxidizer pressure ratio is in a range of 0.8775 to 1.4917, the propellant injector with one or more fuel injector nozzles and one or more oxidizer injector nozzles having particular cross-sectional areas that result in the fuel-oxidizer pressure ratio being in the range of 0.8775 to 1.4917 can be manufactured or ordered.

Some embodiments of the method, further include identifying an ideal total momentum of the RDE; calculating a momentum of each propellant; calculating an actual total momentum of the RDE based on the momentum of each propellant; and if the actual total momentum of the RDE does not meet a threshold equivalence to the ideal total momentum of the RDE, altering the mass flowrate of one or more propellants and recalculating the cross-sectional area of a corresponding propellant injector nozzle.

Some embodiments include a method of designing a propellant injector for a new RDE. The method includes identifying a preferred fuel propellant and a preferred oxidizer propellant. In some embodiments, the preferred fuel propellant is hydrogen and the preferred oxidizer propellant is oxygen.

The method further includes acquiring an initial mass flow rate for the preferred fuel propellant through a fuel injector nozzle and an initial mass flow rate for the preferred oxidizer propellant through an oxidizer injector nozzle. Acquiring the mass flow rate of each preferred propellant can include identifying a fuel-air equivalence ratio of the RDE and a total mass flow rate of the RDE and calculating the mass flow rate for each preferred propellant based on the fuel-air equivalence ratio of the RDE and a total mass flow rate of the RDE.

The method also includes identifying a temperature for each propellant. The temperature for each preferred propellant is based on at least a propellant storage system or propellant feed system of the RDE.

The method further includes configuring the RDE so that an initial upstream pressure of the preferred fuel propellant and an initial upstream pressure of the preferred oxidizer propellant meet a fuel-oxidizer pressure ratio in a range of 0.8775 to 1.4917. Each initial upstream pressure is upstream relative to an outlet aperture of a corresponding injector nozzle.

Then, an initial cross-sectional area of the fuel injector nozzle is calculated using Equation (1), where $\dot{m}$ is the initial mass flow rate of the preferred fuel propellant, A is the initial cross-sectional area of the fuel injector nozzle, P is the initial upstream pressure of the fuel propellant, T is the temperature of the fuel propellant, R is the gas specific constant of the preferred fuel propellant, and $\gamma$ is the specific heat ratio of the preferred fuel propellant. In addition, an initial cross-sectional area of the oxidizer injector nozzle is calculated using Equation (1), where $\dot{m}$ is the mass flow rate of the preferred oxidizer propellant, A is the initial cross-sectional area of the oxidizer injector nozzle, P is the initial upstream pressure of the preferred oxidizer propellant, T is the temperature of the preferred oxidizer propellant, R is the gas specific constant of the preferred oxidizer propellant, and $\gamma$ is the specific heat ratio of the preferred oxidizer propellant. Finally, the propellant injector with one or more fuel injector nozzles and one or more oxidizer injector nozzles having cross-sectional areas that result in the fuel-oxidizer pressure ratio being in the range of 0.8775 to 1.4917 can be manufactured or ordered.

Some embodiments of the method further include, if an upstream pressure range for the fuel propellant overlaps an upstream pressure range for the oxidizer propellant, selecting upstream pressures for both the fuel propellant and the oxidizer propellant such that the fuel-oxidizer pressure ratio is in the range of 0.8775 to 1.4917; and if the upstream pressure for the fuel propellant or the oxidizer propellant are unknown, modifying the manifold design to regulate the upstream pressure for the fuel propellant or the oxidizer propellant, such that the fuel-oxidizer pressure ratio is in the range of 0.8775 to 1.4917.

Some embodiments of the method, further include identifying an ideal total momentum of the RDE; calculating a momentum of each propellant; calculating an actual total momentum of the RDE based on the momentum of each propellant; and if the actual total momentum of the RDE does not meet a threshold equivalence to the ideal total momentum of the RDE, altering the mass flowrate of one or more propellants and recalculating the cross-sectional area of a corresponding propellant injector nozzle.

Some embodiments of the present invention include a RDE injector having a plurality propellant injector nozzle pairings. Each pairing includes a fuel injector nozzle and an oxidizer injector nozzle. In addition, each paired fuel injector nozzle and oxidizer injector nozzle are configured such that a fuel propellant and an oxidizer propellant passing through the respective nozzles have a fuel-oxidizer pressure ratio in a range of 0.8775 to 1.4917. In some embodiments, the fuel propellant is hydrogen and the oxidizer propellant is oxygen.

In some embodiments, each pairing is arranged in an impinging doublet configuration with an interior angle between 55° and 65°. In some embodiments, each pairing is arrayed in a circumferential pattern about the RDE injector. Some embodiments, further include a ratio of injector pair spacing in a radial direction by injector diameter between 2.5 and 2.7. Some embodiments, further include a ratio of injector pair spacing in a circumferential direction by injector diameter is between 3.3 and 3.6.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
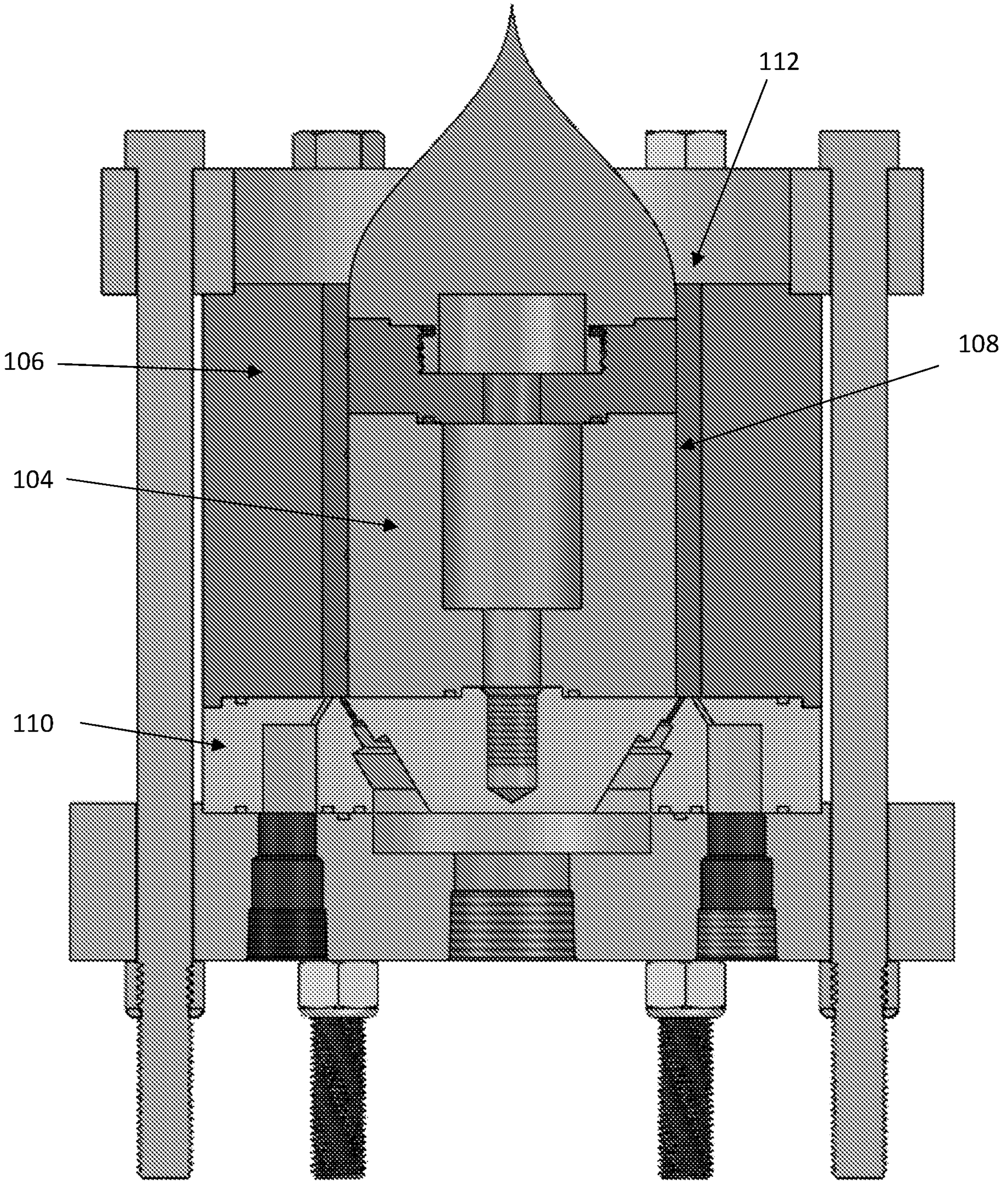
FIG. 1 is a schematic diagram of the common components in an embodiment of an RDE.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The present invention includes a method for designing a RDE injector based on a preferred propellant mixture. Some embodiments include one or more computer systems configured to execute the novel method described herein. The present invention also includes a RDE injector configured to produce the proper mix of hydrogen and oxygen propellants for detonability.

Regarding terminology, it is important to note that "RDE" and "RDRE" may be used interchangeably through the course of this description. Both terms are the same in referring to the rotating detonation technology in concept and application. The $H_2/O_2$ injector of the present invention could be used in a space environment as a rocket propulsion system but is not limited to this application; thus, the use of RDRE and RDE are interchangeable herein.

As exemplified in FIG. 1, RDE 102 consists of inner body 104 and outer body 106, which form the boundary of annulus channel 108 along which a detonation wave (or waves) propagates. For a typical RDE, one end of annulus channel 108 includes a propellant injection mechanism 110 of any combination of injectors, slots, nozzles, etc. The other end of annulus channel 108 includes exhaust port 112, which generates thrust or hot products for energy extraction.

As previously noted, the propagation of a detonation in a RDE is heavily dependent on the mixing of the propellants, which is primarily controlled by the injector scheme of injector mechanism 110. For gaseous hydrogen fuel, there are two challenges that have been found for detonation in the RDE. The first challenge is inherent to the high reactivity of hydrogen which causes it to rapidly deflagrate instead of detonating, thereby starving any potentially propagating detonation of its reactants. The second challenge is due to the high diffusivity of hydrogen which proves difficult for favorable local mixing. Both challenges have prevented the successful detonation of hydrogen and oxygen propellants in RDEs until this invention.

As will be explained below, the design method of the present invention incorporates the propellants and the operating conditions of the engine to determine the injector design that is most favorable to mixing and successful engine operation. This methodology created the novel RDE injector 110 of the present invention which allows for successful engine operation using $H_2$ and 02 propellants.

The Method of Designing a RDE Injector

As explained in the Experimental Section, it was determined that equivalent upstream pressures promote the best mixing for propellants (i.e., fuel and an oxidizer) and thus more complete combustion and detonability by making the jet re-pressurization time scales similar. Thus, the method of designing a RDE injector is based on establishing equivalent upstream pressures between the fuel and the oxidizer. In some embodiments, equivalent upstream pressures mean that the pressure ratio between the fuel and oxidizer fall within a range of 0.8775-1.4917.

Referring to FIG. 1, the term "upstream" refers to a direction away from the exhaust end of the RDE and towards the injector mechanism 110. Thus, the upstream pressure for each propellant can be determined in the nozzle sections (fuel nozzle section 114 and oxidizer nozzle section 116) and/or within the flow channels (fuel flow channel 118 and oxidizer flow channel 120) leading up to nozzle sections 114 and 116, respectively. In some embodiments, the upstream pressure is measured/calculated from the same general sections of the flow paths of the propellants that is upstream from the outlet apertures (fuel outlet aperture 122 and oxidizer outlet aperture 124) of nozzle sections 114 and 116, respectively.

Figure 2:
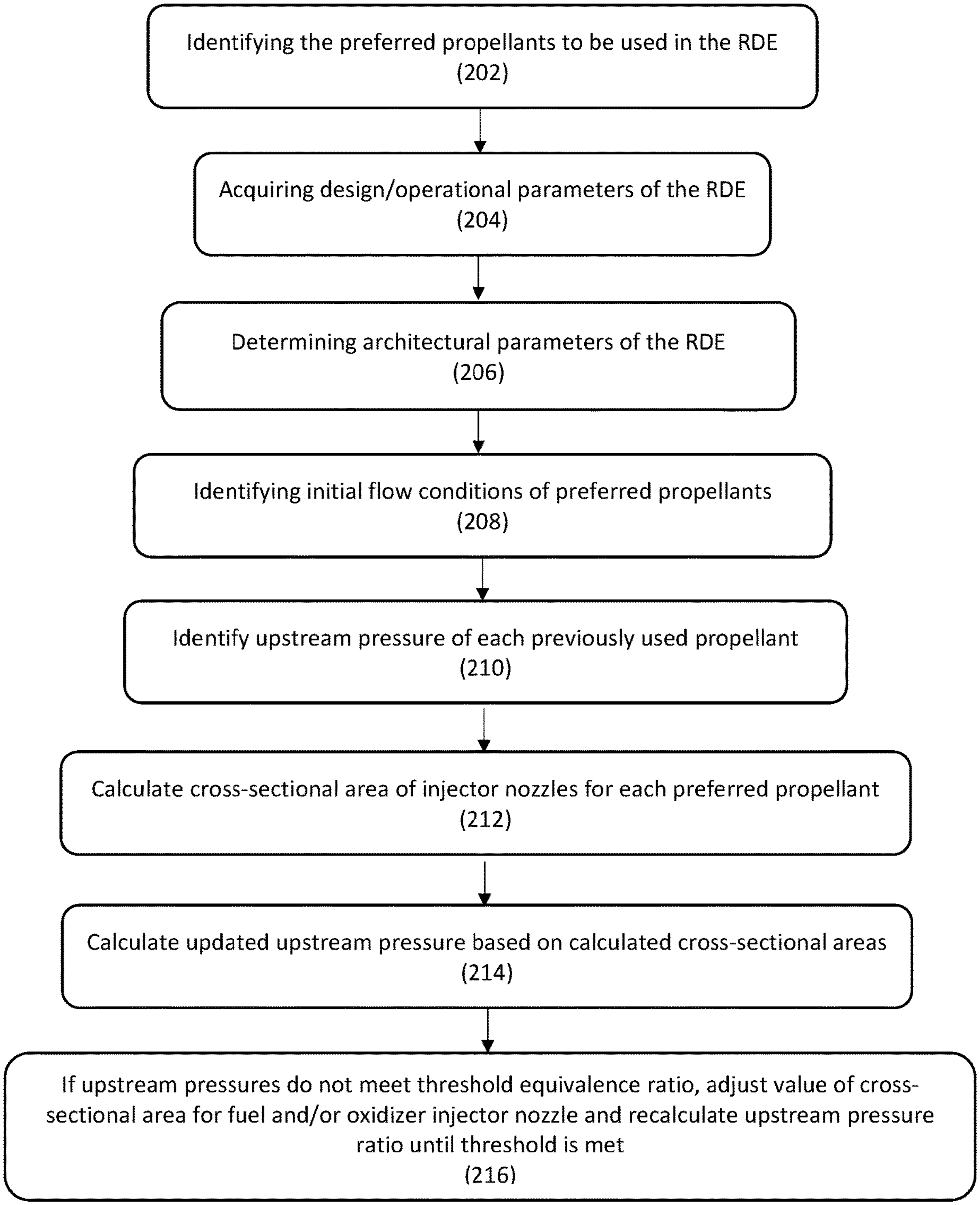
FIG. 2 is a flowchart of an embodiment of the method of designing a RDE injector.

Referring now to FIG. 2, an embodiment of the method of designing an RDE injector to operate with a pair of preferred propellants generally starts with first identifying the preferred propellants to be used in the RDE at step 202. In identifying the preferred propellants, the gas specific constant and the specific heat ratios for each propellant are identifiable.

Next, the design/operational parameters of the RDE are acquired at step 204. Non-limiting examples of the design/operation parameters of the RDE include size, propellants fed into the RDE, and engine characteristics (e.g., the impulse and thrust production of the engine). These parameters can be provided for a "to be built" RDE or determined from an original architecture of an existing RDE design. Accordingly, step 206 varies depending on whether the RDE is an existing RDE design or a new RDE design (covered in FIG. 3). If the RDE is a new RDE, step 206 includes identifying a preferred architecture of the new, non-existing RDE. Once the architecture is known, the design/operation parameters of the RDE can be determined. It should be noted that the chronology of steps 204 and 206 may be reversed or occur simultaneously.

Based on the architecture and operational parameters of the RDE, the starting flow conditions of the propellants are determined at step 208. The starting flow conditions include but are not limited to the mass flow rates of the preferred propellants. While the mass flow rate of each propellant may be provided, in some instances, the total mass flow rate of the engine can be provided with the fuel-air equivalence ratio. If the total mass flow rate of the engine and the fuel-air equivalence ratio are known, then the individual mass flow rates of each propellant can be calculated.

The process further requires identify an initial upstream pressure (i.e., the pressure upstream of the injector outlet apertures 122 and 124) for each propellant. The way in which the initial upstream pressure of the propellants is acquired varies depending on whether the RDE is new or pre-existing. As will be explained in reference to FIG. 3, upstream pressures for the preferred propellants to be used on a new RDE design are provided or estimated as pressure ranges based on the tank and feed system intended to be used on the new RDE. Referring back to FIG. 2, for a pre-existing RDE, the upstream pressures for both propellants are initially set to the upstream pressures of the previously used propellants at step 210. These initial upstream pressures are used as a starting point to iteratively calculate the required cross-sectional area of the fuel injector nozzle and oxidizer injector nozzle to ensure that the upstream pressure ratio for the propellants falls within an equivalence ratio.

Once the starting flow conditions are known for each propellant, Equation 1 is used separately for each propellant (i.e., the fuel and the oxidizer) to calculate an initial cross-sectional area for each nozzle at step 212.

$$\dot{m} = \frac{AP}{\sqrt{T}}\sqrt{\frac{\gamma}{R}}\left(1+\frac{\gamma-1}{2}\right)^{\frac{\gamma+1}{2(\gamma-1)}} \qquad \text{Equation 1}$$

In Equation 1, $\dot{m}$ is the mass flow rate of the preferred propellant, A is the cross-sectional area of the nozzle section, P is the upstream pressure of the previously used propellant, T is the temperature of the preferred propellant, R is the gas specific constant of the preferred propellant, and $\gamma$ is the specific heat ratio of the preferred propellant.

While the cross-sectional area is identified as the cross-sectional area of nozzle sections 114 and 116, some embodiments will calculate the cross-sectional area of flow channels 118 and 120 at different locations than nozzle sections 114 and 116. In some embodiments, the cross-sectional area is calculated from a location within flow channels 118 and 120 that has the smallest cross-sectional area. In some embodiments, the temperature, pressure, and cross-sectional area are determined at the same general upstream location from the respective outlet apertures 122 and 124.

Using existing architecture and a previously used combination of propellants, Equation 1 is used with the parameters corresponding to the use of the previous propellants as starting points. More specifically, the original RDE design provides the mass flow rate value and temperature value for Equation 1. Likewise, the previously used propellants provide the initial upstream pressure value for Equation 1. However, the gas specific constant and the specific heat ratio values correspond to the preferred propellants. With these values, Equation 1 can be used to calculate initial cross-sectional areas of the injector nozzles for each of the preferred propellants at step 212.

Once the initial cross-sectional area for each injector nozzle (fuel injector cross-sectional area and oxidizer injector cross-sectional area) is calculated, these initial cross-sectional areas are plugged back into Equation 1 to calculate an updated upstream pressure for each of the preferred propellants at step 214. After each recalculation, these upstream pressures are compared to each other to determine if they are equivalent or meet an equivalence ratio threshold. In some embodiments, the equivalence ratio threshold is a fuel-oxidizer pressure ratio within the range of 0.8775-1.4917.

If the upstream pressures are not equivalent, one or both of the fuel injector cross-sectional area and oxidizer injector cross-sectional area are incrementally adjusted to recalculate the upstream pressure for both the fuel and the oxidizer at step 216. After each recalculation, these upstream pressures are compared to each other to determine if they meet the equivalence ratio. If the upstream pressures meet the equivalence ratio, the fuel injector cross-sectional area and oxidizer injector cross-sectional area are confirmed as being appropriate for operating the RDE with the new propellants. The RDE injector is then manufactured or modified in accordance with the new cross-sectional areas.

Figure 3:
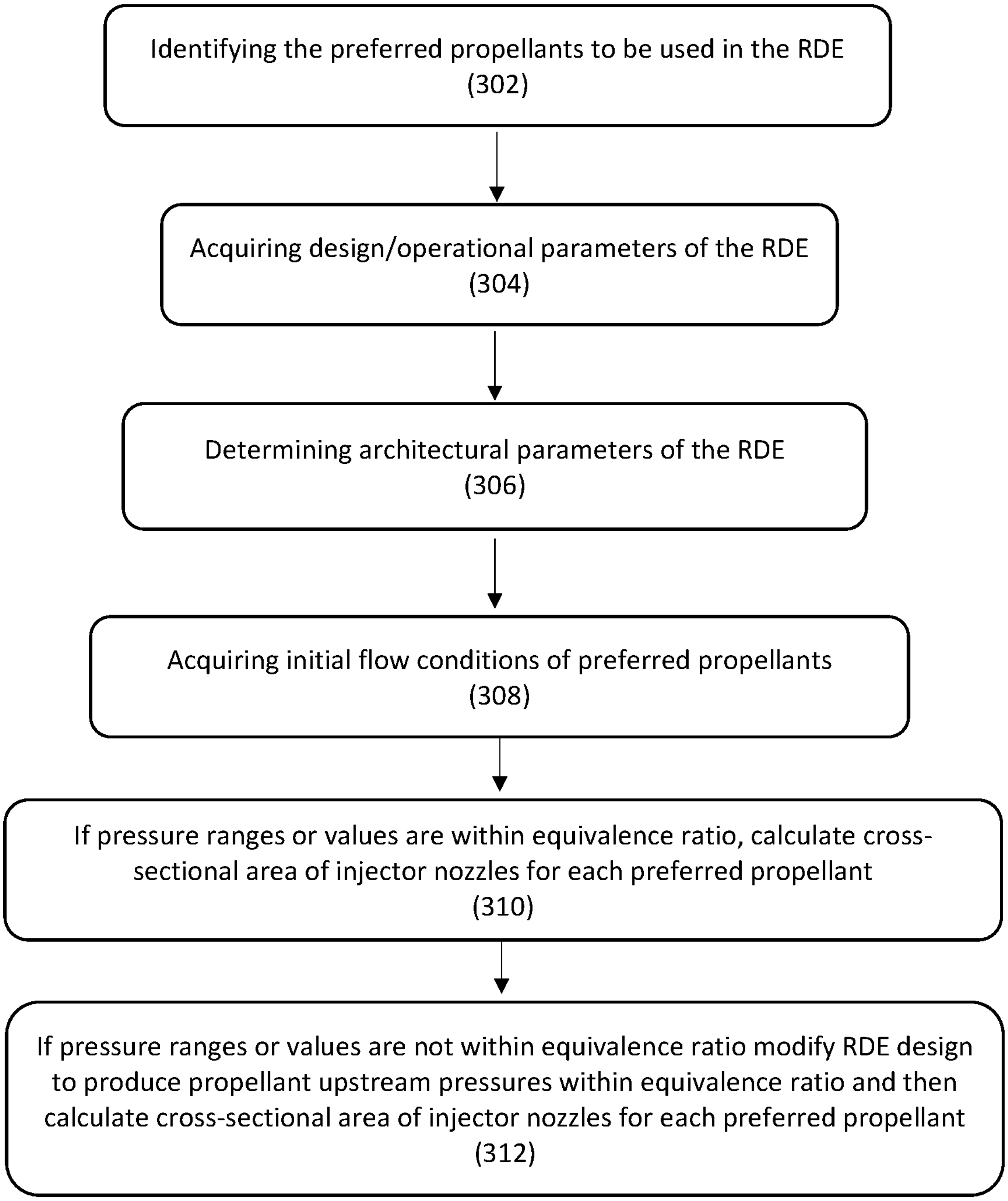
FIG. 3 is a flowchart of an embodiment of the method of designing a RDE injector.

Referring now to FIG. 3, the method of designing an RDE injector for a new RDE to operate with preferred propellants generally starts with first identifying the preferred propellants to be used in the RDE at step 302. In identifying the preferred propellants, the gas specific constant and the specific heat ratios for each propellant are identifiable.

The design/operational parameters and the preferred architecture of the new RDE are also acquired at steps 304 and 306. When starting with a set of parameters for building a new RDE and/or new RDE injector, the initial values for Equation 1 are provided or estimated. Non-limiting examples of these parameters include the total mass flow rate, fuel-air equivalence ratio, temperature of the propellants, mass flow rates of the individual propellants, and upstream pressures of the propellants. These parameters can be provided as a preferred set of values or as a function of the components of the RDE. For example, the temperature of the oxidizer and the fuel could be controlled in the RDE using a temperature controlling device common in propulsion systems. Additionally, or alternatively, the new RDE will likely include storage tanks for the fuel and oxidizer. Thus, the gasses in these storage tanks will have a predetermined pressure and thus a predetermined temperature.

Some embodiments further include acquiring the initial flow conditions of the preferred propellants based on parameters of the RDE as a whole, which is noted in step 308. The initial flow conditions are a result of the operational parameters or as a result of build preferences. Again, these initial flow conditions include an upstream pressure range and a preferred mass flow rate for each propellant. In some embodiments, the pressure range is a maximum established by the maximum pressure that the tanks, feed system, and controllers can handle or control upstream. If the upstream pressure range for the fuel overlaps the upstream pressure range for the oxidizer, the upstream pressures can be equated (i.e., chosen such that the ratio of the fuel pressure to oxidizer pressure is in the equivalence range) and the cross-sectional areas of both injectors can be calculated from Equation 1 at step 310.

In the case that the equivalent operating pressure ranges between the fuel and oxidizer, are unknown or not provided, embodiments of the method of the present invention include modifying the manifold design to regulate the pressure of one or both of the fuel and the oxidizer, such that the pressure ranges fall into the equivalence ratio range at step 312. In referencing Equation 1, the remaining unknown variable is the cross-sectional area of each of the injector flow channels. For each of the oxidizer injector and the fuel injector, using an initial upstream pressure that falls within the upstream pressure range, the cross-sectional area for each injector flow channel is at least initially determined.

Figure 4:
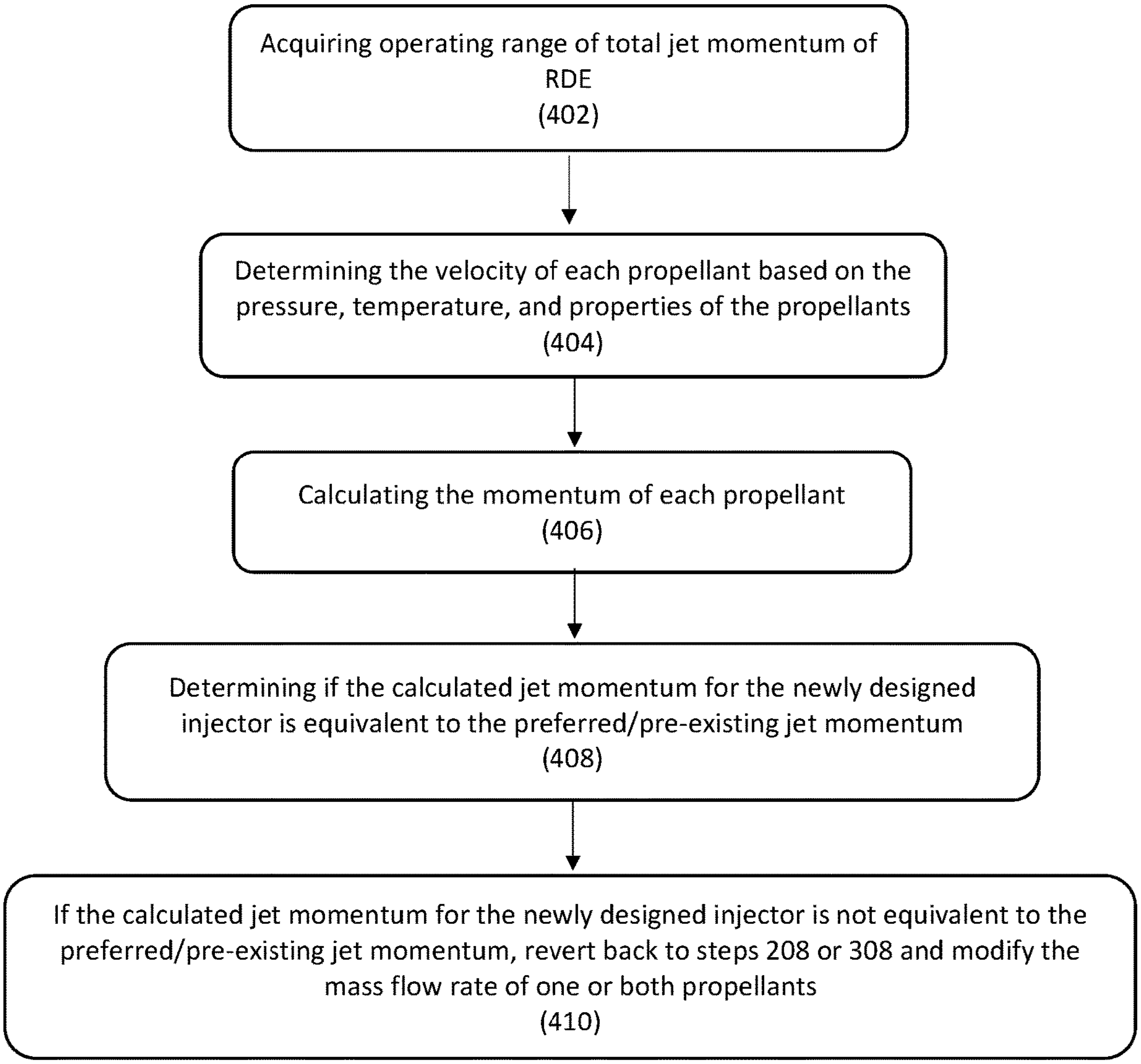
FIG. 4 is flowchart of an exemplary secondary design loop.

Some embodiments of the method further include a secondary design loop, which is exemplified in FIG. 4. The secondary design loop includes steps for determining whether the ratio of jet momentums of the propellant and the oxidizer as established in the first design loop (FIGS. 2 and 3) are equivalent to the desired ratio of jet momentums determined from the starting flow conditions. If the ratios are not equivalent, the method includes steps for adjusting the injector design to achieve equivalent jet momentum ratios.

It should be noted that equivalent jet momentum ratios means that the ratios fall within the same threshold range over the range of operating conditions of the RDE. For example, if the starting flow conditions include a jet momentum ratio ranging from 0.51-0.86, then a RDE injector would include an equivalent jet momentum ratio if the RDE injector designed in the first design loop fell within the same ratio range of 0.51-0.86. Accordingly, the jet momentum design loop starts with step 302 in which the operating range of the jet momentum of the RDE is determined or acquired. This range is either provided as a parameter of a new RDE or it is determined as a factor of the pre-existing RDE based on the jet momentums of the previously used propellants with the previously designed injector.

To compare the preferred total jet momentum of the RDE to the combined jet momentum of the preferred propellants, the momentum of each propellant must be calculated. This is achieved using Equation 2.

$$p = \dot{m} * v \qquad \text{Equation 2}$$

In Equation 2, p is jet momentum (i.e., the momentum of the flow of the propellant when exiting the injector outlet aperture), $\dot{m}$ is the mass flow rate of the propellant, and v is the velocity of the propellant when exiting the injector outlet port. The mass flow rate of each propellant is known based on the initial design loop for establishing equivalent plenum pressure (aka "upstream pressure). The velocity of each propellant can be derived from the pressure, temperature, and properties of the propellants at step 304. Using Equation 2, the jet momentum is calculated for each propellant based on the injector parameters following the initial design loop at step 306.

Figure 5:
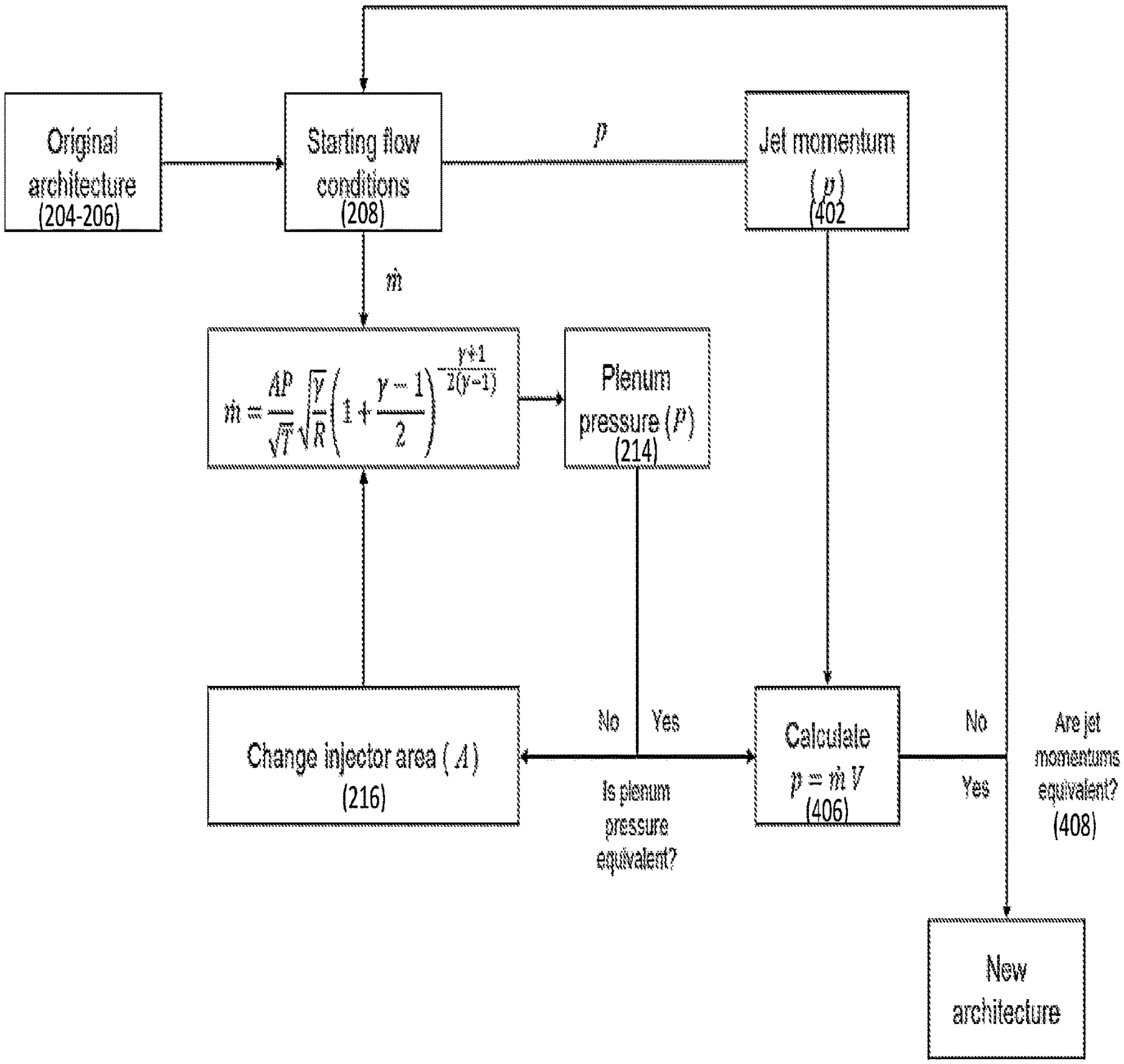
FIG. 5 is a block diagram of an embodiment of the method of designing a RDE injector.
Figure 6A:
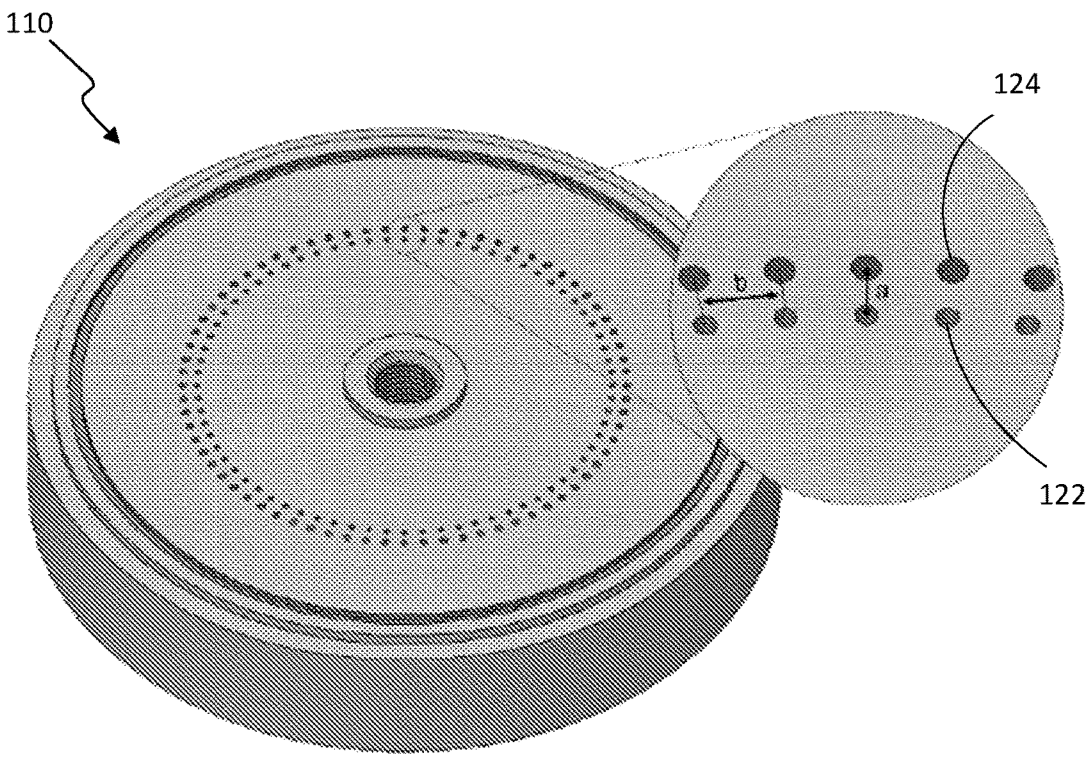
FIG. 6A is a perspective view of an exemplary propellant injector.
Figure 6B:
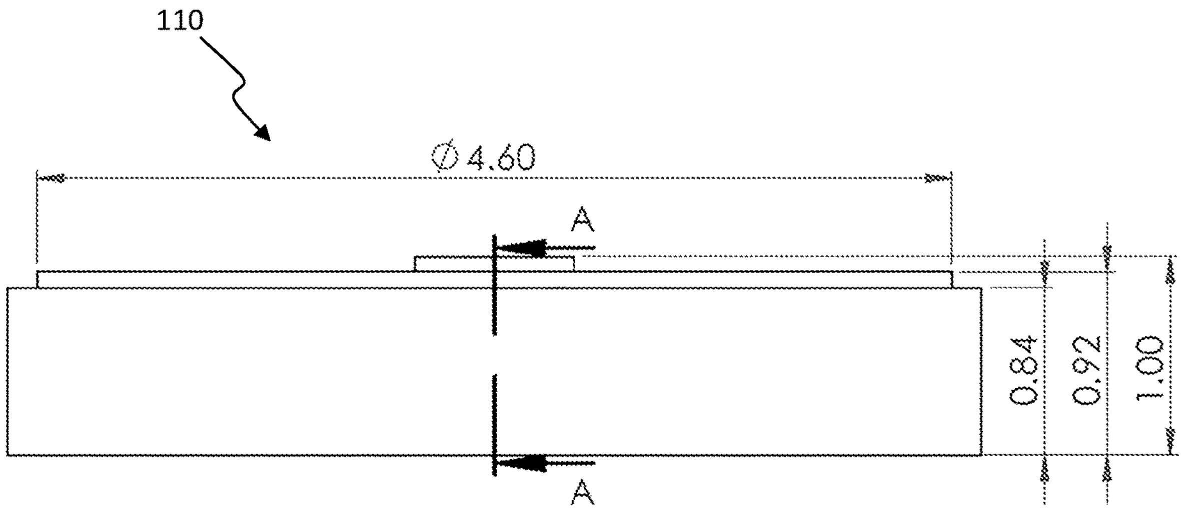
FIG. 6B is a side view of an exemplary propellant injector.
Figure 6C:
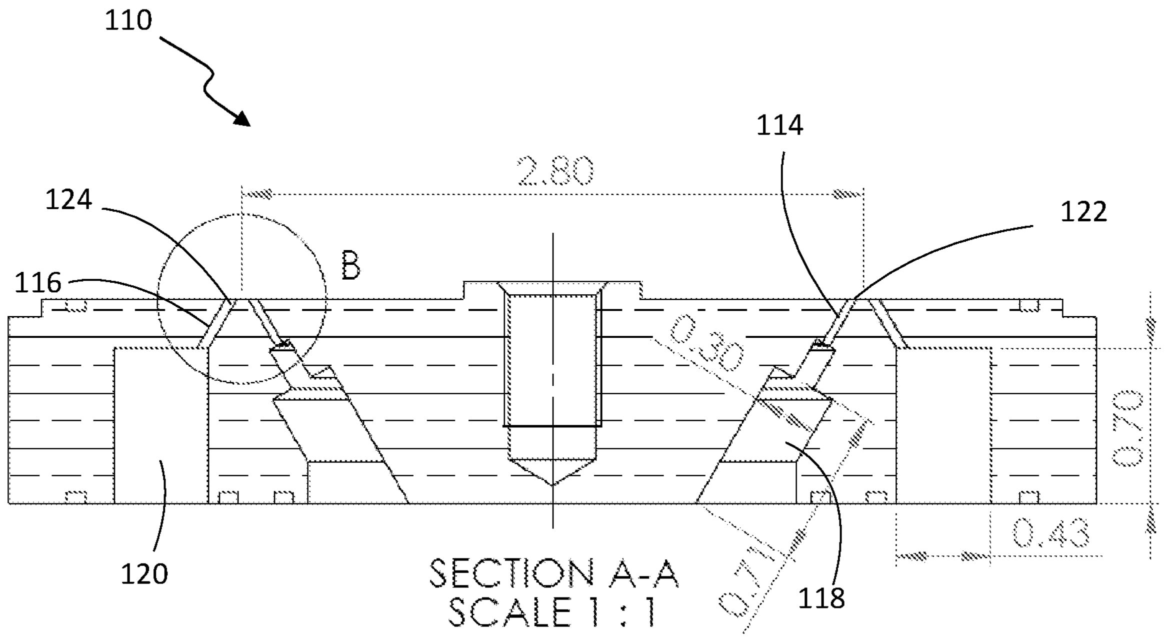
FIG. 6C is a cross-sectional view of an exemplary propellant injector.
Figure 6D:
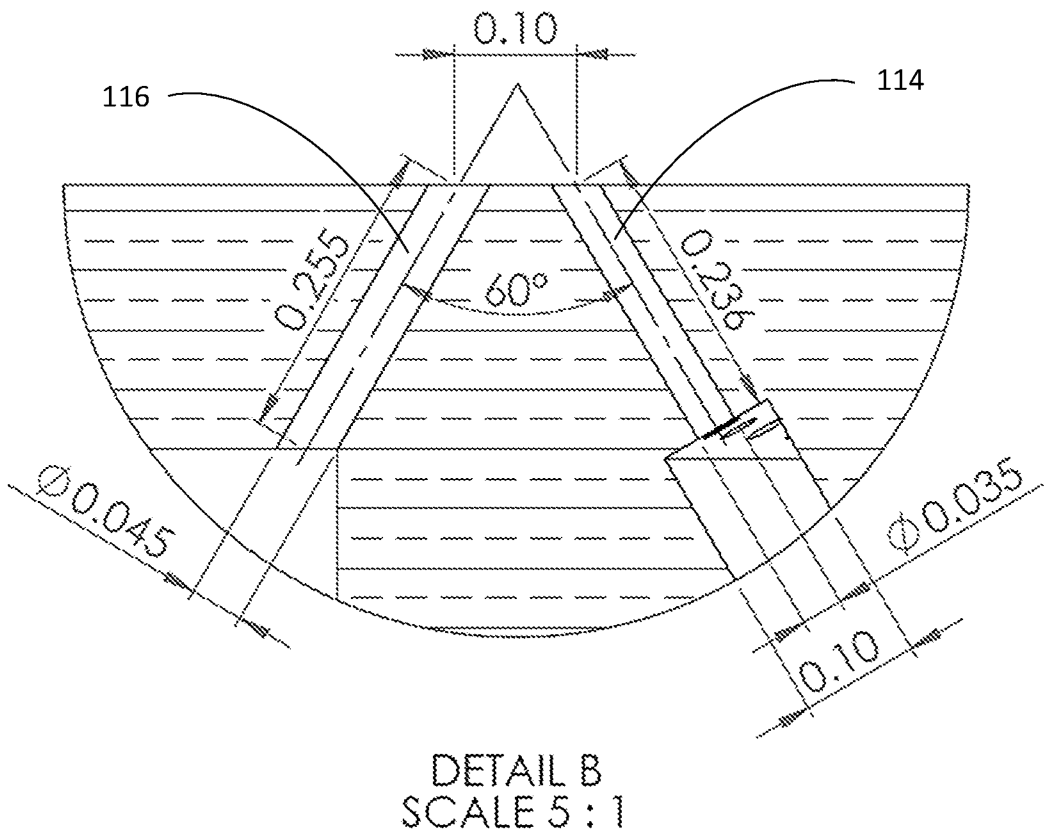
FIG. 6D is a close-up cross-sectional view of Detail B from FIG. 6C.

After calculating the jet momentums of each propellant for the new injector design following the first design loop, said jet momentums are compared to the preferred jet momentum of the new RDE or the jet momentum of the pre-existing RDE based on the jet momentums of the previously used propellants with the previously designed injector at step 408. If the calculated jet momentum for the newly designed injector is equivalent to the preferred/pre-existing jet momentum, the injector design is ready for manufacturing and use. In some embodiments, equivalent jet momentum is within generally 10%. If the jet momentums from the designed injector are not equivalent to the jet momentums established by the stating flow conditions, the system reverts back to Equation 1 in the first design loop and begins modifying the mass flow rate of one or both propellants by altering the injector nozzles or the flow channels leading to the injector nozzles at step 410. This loop can continue until a mathematical error is below a predetermined threshold. In some embodiments, this error threshold corresponds to a difference in jet momentums of 10% or less. The combination of the two loops is exemplified in FIG. 5

Experimental Testing

During experimentation, a current RDRE was selected and modified for the new propellants. The selected RDRE was the 3-inch Distribution A AFRL RDRE that originally operates with gaseous methane ($CH_4$) and oxygen ($O_2$). The nominal flow condition for this RDRE was 0.6 lbm/s total mass flow rate at 1.1 fuel-air equivalence ratio. Using the design loop shown in FIG. 2 and starting with this total flow rate and equivalence ratio, new individual flow rates for use of hydrogen and oxygen were calculated. Then, using the compressible mass flow equation, Equation 1, the area of each injector, A was calculated for the state of equivalent upstream pressures, P for both propellants.

The fuel and oxidizer injector momentum were then calculated, assuming sonic injection. These jet momentums were then compared to the injector jet momentums for the original propellant, modifying the input flow conditions into Equation 1 until the new injector size resulted in (1) equivalent P for both propellants and (2) equivalent total jet momentum between the new injector size flowing $H_2/O_2$ and the original injector size flowing $CH_4/O_2$. The new fuel and oxidizer injector diameters were calculated to be 0.035 inch and 0.045 inch, respectively. Altogether, the design of the injector and its modifications have set the standard architecture for detonating gaseous hydrogen and oxygen in the RDRE.

The injector assembly 110, which is shown in detail in FIGS. 6, was manufactured from a single piece of Alloy 360 Brass. The injector assembly was developed to operate as a direct impinging doublet mechanism with a 60° interior angle, such that the interior angle formed at the jet interaction is 60° as best depicted in FIGS. 6C-6D. There are 72 discrete injector pairs (fuel nozzle section 114 and oxidizer nozzle channel 116) fuel injector arrayed in a circumferential pattern about a circle of diameter 2.8 inches. This injector pattern is meant to sit between an inner and outer body which forms the boundary for the combustor annulus channel 108 on the RDRE.

Each pair consists of a fuel injector of circular cross section and an oxidizer injector of similar circular cross section. The injector nozzle diameters, D are 0.035 inch and 0.045 inch for the fuel and oxidizer injector nozzles 114 and 116, respectively. The injector contour for both the fuel and oxidizer injector nozzles is a simple cylindrical channel of length over diameter ratio, or l/d of 6.468 and 5.695 for the fuel nozzle 114 and oxidizer nozzle 116, respectively. The sizing of the injector diameters maintains an equivalent pressure upstream of the injector at favorable flow conditions of the RDRE for a similar geometry, thereby maintaining similar sonic jet momentums between both propellants and therefore the best mixing conditions for detonability.

The full parameters of injector 110 are listed in Table 1. Table 1 lists some parameters as ranges; as such, an injector designed within this range of design parameters will successfully detonate hydrogen and oxygen in an RDRE; an injector not designed within this range of design parameters will not be able to detonate hydrogen and oxygen in an RDRE.

| | Hydrogen (Fuel, F) | Oxygen (Oxidizer, O) |
|---|---|---|
| Injector Diameter (DO/DF) | 1.2-1.4 | |
| Injector Length by Injector Diameter (l/D) | 6-7 | 5-6 |
| Interior Angle | 55-65° | |
| Number of InjectorPairs by Injector Diameter (N/DF) | 2000-2200 per unit inch | |
| Injector Pair Spacing by Injector Diameter (a/DF) | 2.5-2.7 | |
| Injector Pair Spacing by Injector Diameter (b/DF) | 3.3-3.6 | |
| Pressure Ratio (PF/PO) | 0.8775-1.4917 | |
| Mass Flow Ratio (mF/mO) | 0.1263-0.2147 | |
| Annulus Width by Injector Diameter (Cw/DF) | 5.5-5.9 | |
| Annulus Diameter by Annulus Width (CA/Cw) | 14-16 | |
| Jet Momentum Ratio (pF/pO) | 0.51-0.86 | |

The RDE Injector

RDE injector 110 of the present invention includes specific design parameters configured to produce equal upstream pressures for the fuel and oxidizer gas. In some embodiments, RDE injector 110 is configured to operate with hydrogen and oxygen. Moreover, the injector of the present invention can be used in any rotating detonation engine technology that operates with hydrogen and oxygen propellants. RDE injector 110 and its specifications can be modified to scale up to a larger diameter RDRE for higher flow rates.

As previously noted, equivalent upstream pressures mean that the pressure ratio between the fuel and oxidizer fall within a range of 0.8775-1.4917. In addition, the term "upstream" refers to an area beyond the outlet apertures 122 and 124 in direction away from the exhaust end of the RDE.

As shown in FIGS. 6, RDE injector 110 of the present invention includes an impinging doublet injection scheme with micronozzle injector channels 114 and 116 that choke the gas propellant flow as it passes through the injector outlet apertures 122 and 124, thereby regulating the flow rate of propellants as it enters the combustion annulus. In some embodiments, the interior angle between the impinging doublet nozzle configuration is 60°. In some embodiments, the interior angle between the impinging doublet nozzle configuration is between 55° and 65°.

While the depicted embodiment includes 72 discrete injector pairs arrayed in a circumferential pattern about the injector, the number of pairs may be increased or decreased depending on the size of the RDE. In some embodiments, the ratio of injector pair spacing in a radial direction by injector diameter is between 2.5 and 2.7. In some embodiments, the ratio of injector pair spacing in a circumferential direction by injector diameter is between 3.3 and 3.6.

Moreover, this injector pattern is meant to sit between an inner and outer body which forms the boundary for the combustor annulus on the RDRE. Thus, the nozzle locations and the number of nozzle pairings will correspond to the size of the RDE and in turn the diameter of the combustor annulus. In some embodiments, the ratio of the number of injector pairs by injector diameter is between 2000 and 2200 per unit inch.

Each nozzle pair includes a fuel injector of a generally circular cross section and an oxidizer injector of similar circular cross section. In some embodiments, the injector diameters, D are 0.035 inch and 0.045 inch for the fuel and oxidizer injector holes, respectively. In some embodiments, the ratio of the oxidizer injector diameter to the fuel injector diameter is between 1.2 and 1.4.

In some embodiments, the injector contour for both the fuel and oxidizer injectors is a simple cylindrical channel. However, the shape and cross-sectional shape of the channels may have alternative shapes.

Some embodiments further include a specific length to diameter ratio for the injector channels. For example, the l/d ratio may be between 6.468 and 5.695 for the fuel and oxidizer, respectively. In some embodiments, the l/d ratio for the fuel injector is between 6 and 7, and the l/d ratio for the oxidizer injector is between 5 and 6.

The sizing of the injector diameters maintains an equivalent pressure upstream of the injector at favorable flow conditions of the RDRE for a similar geometry, thereby maintaining similar sonic jet momentums between both propellants and therefore the best mixing conditions for detonability. More specifically, the mass flow rate ratio of fuel to oxidizer is between 0.1263-0.2147 and the jet momentum ratio of fuel to oxidizer is between 0.51 and 0.86.

Some embodiments of the RDE injector are further tailored to the parameters of the RDE annulus. For example, the ratio of annulus width to injector diameter is between 5.5 and 5.9 and the ratio of annulus diameter to annulus width is 14-16.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A RDE injector, comprising:

a plurality of propellant injector nozzle pairings, wherein each pairing is arrayed in a circumferential pattern about the RDE injector;

each pairing including a fuel injector nozzle and an oxidizer injector nozzle, wherein each fuel injector nozzle is in fluidic communication with a source of hydrogen gas and each oxidizer injector nozzle is in fluidic communication with a source of oxygen;

each fuel injector nozzle having a length over diameter ratio between 6 and 7, and each oxidizer injector nozzle having a length over diameter ratio between 5 and 6;

a ratio of (1) a diameter of each oxidizer injector nozzle to (2) a diameter of each fuel injector nozzle between 1.2 and 1.4;

wherein the injector includes micronozzle injector channels that choke the gas propellant flow as it passes through the injector outlet apertures;

wherein each paired fuel injector nozzle and oxidizer injector nozzle are configured such that a nozzle injection pressure of hydrogen and a nozzle injection pressure of oxygen passing through the respective nozzles have a hydrogen-oxygen nozzle injection pressure ratio in a range of 0.8775 to 1.4917;

a ratio of a mass flow rate of hydrogen over a mass flow rate of oxygen between 0.1263 and 0.2147;

a ratio of (1) a jet momentum of hydrogen at the fuel injector outlet apertures to (2) a jet momentum of oxygen at the oxidizer injector outlet apertures between 0.51 and 0.86, wherein each jet momentum is defined as a product of the corresponding mass flow rate and a flow velocity at the corresponding outlet aperture;

a ratio of (1) radial spacing of an injector nozzle pairing to (2) a diameter of the fuel injector nozzle that is between 2.5 and 2.7; and a ratio of (1) a number of the propellant injector nozzle pairings to (2) the diameter of each fuel injector nozzle that is between 2000 and 2200 per unit inch;

wherein the circumferential pattern is disposed between an inner body and an outer body that form a boundary for a combustor annulus channel of an RDE;

a ratio of (1) an annulus width of the combustor annulus channel to (2) the diameter of each fuel injector nozzle that is between 5.5 and 5.9:

a ratio of (1) an annolus diameter of the combustor annulus channel to (2) the annulus width of the combustor annulus channel that is between 14 and 16; and a ratio of (1) a circumferential spacing of adjacent injector pairs to (2) a diameter of the fuel injector nozzle that is between 3.3 and 3.6.

2. The RDE injector of claim 1, wherein each pairing is arranged in an impinging doublet configuration with an interior angle between 55° and 65°.

* * * * *